United States Patent Office 3,437,682
Patented Apr. 8, 1969

3,437,682
HALOGENATED POLYFUNCTIONAL
CARBOXYLIC ESTER
James William Finnamore, Minneapolis, Minn., assignor to Ashland Oil & Refining Company, Ashland, Ky., a corporation of Kentucky
No Drawing. Filed Apr. 11, 1966, Ser. No. 541,485
Int. Cl. C07c 69/82, 69/76, 69/80
U.S. Cl 260—475                     6 Claims

ABSTRACT OF THE DISCLOSURE

Novel halogenated carboxylic esters having the general formula:

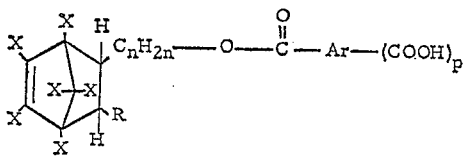

wherein X is chlorine or bromine, R is $-C_mH_{(2m+1)}$ or $C_{(m+1)}H_{(2m+1)}OH$, Ar is an aryl radical, $m$ and $n$ are integers from 0 to 8, inclusive and $p$ is an integer from 1 to 5. These esters are useful as flame retardant monomers for polyesters.

---

The present invention relates to novel halogenated carboxylic esters, polyester resins derived from such esters, and methods for preparing polyester resins which have improved flame-retardant properties.

The halogenated carboxylic esters of the present invention are polyfunctional esters having in their acid form the general formula:

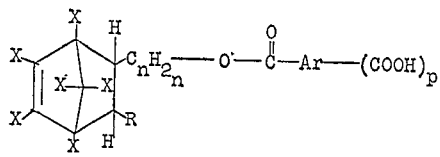

wherein X is chlorine or bromine, R is $-C_mH_{(2m+1)}$ or $-C_mH_{2m}OH$; Ar is an aryl radical, $m$ and $n$ are integers from 0 to 8, inclusive, and $p$ is an integer from 1 to 5.

The term "carboxylic ester" is meant to define esters which contain either carboxylic acid groups or anhydride groups. Thus, although the general formula employed discloses only carboxylic acid groups, it is to be understood that where $m$ is 2 or higher, anhydrides of such acids are included within the scope of the novel compounds employed herein. The integers $n$ and $m$ in each side chain of the bicyclic ring can be the same or different.

The novel esters of the present invention are prepared by the esterification of adducts of unsaturated alcohols and hexahalocyclopentadiene with aromatic polycarboxylic acids, preferably benzene carboxylic acids containing three to four carboxylic acid groups. The hexahalobicyclo (2.2.1) heptene alcohols employed in the formation of the novel carboxylic esters of the present invention are obtained by the Diels-Alder addition of ethylenically unsaturated aliphatic alcohols to the hexahalocyclopentadiene. The addition product is generally formed by heating the reactants in the liquid state to temperatures of 120° C. to 200° C.

The esterification of the adduct with the polycarboxylic acid is conducted under conditions heretofore developed for esterification. The hexahalobicyclo(2.2.1) heptene alcohol can be reacted with the polycarboxylic aromatic acid itself, the anhydride thereof, or the acid halide. Preferably, the anhydride is employed. In the reaction of the acid with the alcohol, an acidic catalyst such as tetra butyl tin or p-toluene sulfonic acid is preferably employed at reaction conditions allowing for the continuous removal of by-product water. The reaction is generally conducted in the presence of an inert organic solvent for both the alcohol and the polycarboxylic compound at temperatures of 90° C. to 260° C.; preferably at temperatures of 170° C. to 190° C. Suitable solvents include dimethylformamide, dimethylacetamide, diethylformamide, dimethylsulfoxide, pyridine, dimethylsulfone, hexamethylphosphoramide, tetramethylenesulfone, butyrolactone, benzene, benzonitrile, dioxane, and furane. Dialkyl carboxamides are the preferred solvents. When an anhydride is used as the carboxylic compound, the esterification can be effected in the melt in the absence of solvents. The reagents are preferably admixed in substantially equimolar proportions.

The halogenated polyfunctional carboxylic esters of the present invention are of particular value as comonomers in the formation of polyester resins having superior flame-retardant properties. In this respect, it is to be noted that the halogenated carboxylic esters are at least difunctional and, thus, act as comonomers in the polyester formation and are randomly distributed along the polyester chain. The efficiency of the novel polyfunctional carboxylic esters in causing the polyester to have flame-retardant properties resides, at least in part, in the ability of the ester to copolymerize rather than to be a chain terminating agent. Additionally, it was discovered that the novel esters of the present invention impart flame-retardant properties to the polyester resin at a much lower concentration level than was heretofore deemed to be necessary to impart flame-retardancy with such conventional agents as tetrachlorphthalic acid or chlorendic acid.

The polyfunctional carboxylic esters of the present invention can be employed in the preparation of any polyester to which flame-retardant properties are to be imparted or the flame-retardant properties of which are to be improved. Thus, both saturated polyesters or alkyd resins and unsaturated polyester resins can be modified by condensation with the novel carboxylic esters. These resins are generally prepared by condensing a polyhydric alcohol with a polycarboxylic compound at temperatures of 100° C. to 300° C. in the presence or absence of a solvent. If desired, acidic catalysts such as tetra butyl tin and p-toluene sulfonic acid can be employed. In addition to the described carboxylic esters, other resin modifiers such as monocarboxylic acids including benzoic acid, and $C_8$ to $C_{26}$ aliphatic mono-carboxylic acids can be added. For most applications, molar ratios of the polyhydric components and the polyacidic compounds are adjusted and reaction times employed such that the resulting resins have acid values below 50. Suitable polyhydric alcohols include ethylene glycol, glycerol, di-, tri-, and tetraethylene glycol, propylene glycol, pentamethylene glycol, decamethylene glycol, pentaerythritol, dipentaerythritol, 1,1,1-trimethylol propane, 1,2,4-butanetriol, and mixtures thereof. Suitable polycarboxylic compounds include phthalic anhydride or acid, terephthalic acid, succinic acid, adipic acid, glutaric acid, pimelic acid, sebacic acid, azelaic acid, suberic acid, 1,4-cyclohexane dicarboxylic acid, citric acid, trimellitic anhydride, pyromellitic anhydride or acid, tetrachlorophthalic anhydride or acid, nadic anhydride, chlorendic acid or anhydride, and mixtures thereof.

The polyfunctional carboxylic esters of the present invention find particular utility in unsaturated polyesters which are useful as binders in the preparation of glass-reinforced shapes, as well as coatings. Flame-extinguishing properties are extremely valuable in glass fiber laminates which find many structural applications. Unsaturated polyester resins suitably modified by the addition of the novel halogenated carboxylic esters are prepared by the condensation of an α,β-ethylenically unsaturated polycarboxylic compound with saturated or unsaturated polyhydric alcohols. It is not necessary that solely an unsaturated polycarboxylic acid compound be employed, but mixtures of such with the described saturated polycarboxylic compounds can be employed. The resulting polyester is then, generally, admixed with from 20% to 70% by weight of the total composition of a vinyl monomer such as styrene, substituted styrenes, methylmethacrylate, ethylacrylate, methylvinyl ether, diallyl phthalate, diallyl maleate, diallyl fumarate, methylvinyl ketone, acrylonitrile, vinyl acetate, and mixtures thereof. On application of the resulting liquid polyester to the reinforcing matrix, an added free-radical polymerization initiator such as peroxide is activated and causes the vinyl monomer to polymerize, thereby forming the final cross-linked polyester. As in the case of the saturated polyesters, suitable modifying agents such as described hereinabove can be added. Additional modifying agents for unsaturated polyesters include acrylic and methacrylic acid. Suitable unsaturated polycarboxylic acids include maleic acid, fumaric acid, itaconic acid, malic acid, mesaconic acid, aconitic acid, glutaconic acid, ethylmaleic acid, citraconic acid, and tetrahydrophthalic acid. Anhydrides can be employed in place of the acids. In addition to the saturated polyhydric alcohols listed above, such unsaturated polyols as 2-butene-1,4-diol; 1,2-dihydroxymethylcyclohexene-4; and 2,3-dihydroxymethylbicyclo(2.2.1)-heptene-5 can be employed. Mixtures of unsaturated acids and unsaturated and saturated acids, as well as mixtures of polyols, can be employed. In general, therefore, the novel carboxylic esters of the present invention can be incorporated in any of the polyester compositions heretofore developed, using the techniques heretofore employed for the preparation of such. When employed in the preparation of such polyesters, the concentration of the novel carboxylic ester can be varied widely and the specific concentration of the ester will depend on the particular properties desired in the resin. Thus, the concentration can be as low as 5% by weight or the halogenated carboxylic ester can constitute the sole polycarboxylic acid component of the polyester. The preferred concentration range is from 20% to 60% by weight of the polycarboxylic acid component of the polyester.

The halogenated carboxylic ester is obtained by the esterification of a hexahalocyclopentadiene adduct with a monounsaturated alcohol, with an aromatic polycarboxylic acid. As stated hereinabove, the ester must be polyfunctional, by which is meant that the ester must have at least one carboxylic acid group and one reactive hydroxyl group, or must contain at least two carboxylic acid groups. Esters which contain at least two carboxylic acid groups are greatly preferred. The carboxylic acids employed in the esterification of the adduct include phthalic, terephthalic, trimellitic, pyromellitic, trimesic, mellophanic, benzene petacarboxylic acid, and mixtures thereof. The adduct employed to form the carboxylic ester is, preferably, the adduct of hexachlorocyclopentadiene or hexabromocyclopentadiene, although mixed halogenated cyclopentadienes can also be employed. In view of the ready reactivity of the halogenated cyclopentadiene with either terminal or internal double bonds, any ethylenically unsaturated vinyl alcohol can be employed. Since vinyl alcohol is unstable, the adduct derivable from vinyl alcohol is prepared from vinyl acetate, followed by hydrolysis. The preparation of the adduct has been disclosed in the literature and thus need not be detailed here. Suitable adducts include 1,4,5,6,7,7-hexachlorobicyclo(2.2.1)-5-heptene-2-methanol;
1,4,5,6,7,7-hexabromobicyclo(2.2.1)-5-heptene-2-methanol;
1,4,5,6,7,7-hexabromobicyclo(2.2.1)-5-heptene-2-ethanol;
1,4,5,6,7,7-hexachlorobicyclo(2.2.1)-5-heptene-2-propanol;
1,4,5,6,7,7-hexachlorobicyclo(2.2.1)-5-heptene-2-methyl-3-methanol;
1,4,5,6,7,7-hexachlorobicyclo(2.2.1)-5-heptene-2,3-dimethanol;
1,4,5,6,7,7-hexachlorobicyclo(2.2.1)-5-heptenol-2;
1,4,5,6,7,7-hexabromobicyclo(2.2.1)-5-heptene-2,3-dimethanol;
hexachloro(2.2.1)-5-heptene-2-ethyl-3-ethanol, and mixtures thereof.

The present invention is further illustrated by the following examples, in which all units of quantity are by weight unless otherwise indicated.

EXAMPLE 1

Into a 3-neck, 2-liter, round-bottom flask is placed 1 mole of 1,4,5,6,7,7-hexachlorobicyclo(2.2.1)-5-heptene-2-methanol dissolved in 200 ml. of dimethylformamide and 1 mole of trimellitic anhydride dissolved in 500 ml. of dimethylformamide. To the reaction mixture is added 500 ml. of toluene, and the mixture is heated slowly to 350° F. and refluxed for 4 hours. The solvent is then boiled off and the reaction terminated. One mole of water is taken off during the reaction. The resulting ester, obtained in quantitative yield, has the formula:

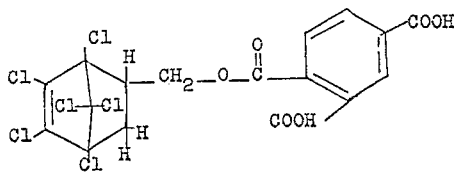

and can be directly employed in the preparation of polyester resins.

EXAMPLE 2

Following the procedure of Example 1, the following ester having the formula:

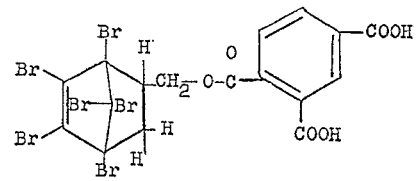

is prepared from 1 mole of trimellitic anhydride and 1 mole of 1,4,5,6,7,7-hexabromobicyclo(2.2.1)-5-heptene-2-methanol.

EXAMPLE 3

Following the procedure of Example 1, the following ester having the formula:

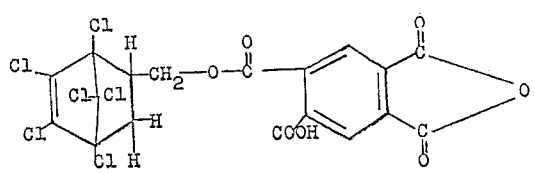

is prepared from 1 mole of pyromellitic anhydride and 1,4,5,6,7,7-hexachlorobicyclo(2.2.1)-5-heptene.

EXAMPLE 4

Following the precedure of Example 1, the following ester having the formula:

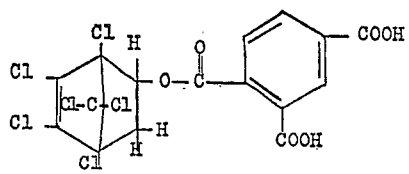

is prepared by reacting 1 mole of trimellitic anhydride with 1 mole of 1,4,5,6,7,7-hexachlorobicyclo(2.2.1)-5-heptenol-2.

EXAMPLE 5

Following the procedure of Example 1, the following ester having the formula:

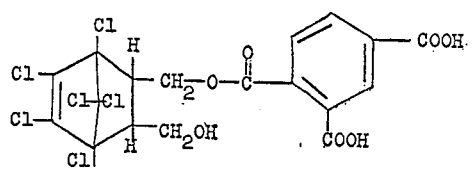

is prepared by reacting 1 mole of trimellitic anhydride with 1 mole of 1,4,5,6,7,7-hexachlorobicyclo(2.2.1)-5-heptane-2,3-dimenthanol.

EXAMPLE 6

Following the procedure of Example 1, the following ester having the general formula:

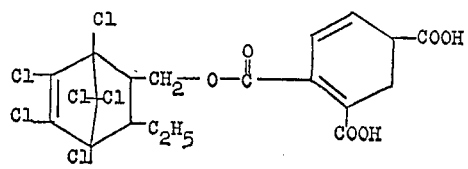

is prepared by reacting 1 mole of trimellitic anhydride with 1 mole of 1,4,5,6,7,7-hexachlorobicyclo(2.2.1)-5-heptene-2-ethyl-3-methanol.

EXAMPLE 7

Into a reaction flask are charged the following reagents:

| | G. |
|---|---|
| Ester of Example 1 (1.63 moles) | 853 |
| Fumaric acid (4.67 moles) | 542 |
| Ethylene glycol (2.82 moles) | 175 |
| Propylene glycol (2.71 moles) | 206 |
| Hydroquinone | 1.6 |

The reagents are heated with agitation to 170° F. to obtain a uniform mixture and then heated slowly to 300° F. The temperature is maintained at 300° F. to 330° F. while water is evolved from the reaction mixture. On decrease of water evolution, the temperature is raised to 370° F. and heating with agitation is continued until an acid value of 25 to 40 is obtained. The temperature is then decreased to 300° F. and the resulting polyester resin is mixed into 685 g. of styrene containing 0.2 g. of monotertiarybutyl hydroquinone as stabilizer. A clear, liquid polyester solution is obtained. A typical resin prepared by this procedure has the following properties on curing with 1% benzoylperoxide for two hours at 150° F. and two hours at 250° F.:

| | |
|---|---|
| Acide value | 35.2 |
| Hydroxyl value | 51.0 |
| Color (Gardner) | 18 |
| Tensile strength p.s.i. | 5,600 |
| Percent elongation | 1.07 |
| Flex strength p.s.i. | 12,400 |
| Flex modulus p.s.i. | 711,000 |
| Heat distortion tem. °C. | 95 |

A three-ply glass laminate having a glass content of about 50% is prepared by the hand lay-up process with 1.5 ounce glass mat. Prior to application of the resin to the glass mat, 0.5% of a 6% cobalt naphthenate solution and 1% of methyl-ethyl ketone peroxide is added to the resin. The laminate cures within about 20 minutes at room temperature. The resulting laminate is nonburning, as determined by ASTM–D1692–59T, the flammability test for polyesters.

EXAMPLE 8

Into a reaction flask were charged the following reagents:

| | G. |
|---|---|
| Ester of Example 1 (1.0 mole) | 317 |
| Maleic anhydride (1.0 mole) | 59 |
| Phthalic anhydride (1.0 mole) | 90 |
| Diethylene glycol (1.65 mole) | 105 |
| Propylene glycol (1.65 mole) | 73 |
| Hydroquinone (20% solution) | 0.6 |
| Organo phospate (glycerol ester of phosphoric acid) | 1.2 |

The reagents were heated with agitation to 170° F. to obtain a uniform mixture and then heated slowly to 300° F. The temperature was maintained at 300 to 330° F. while water was evolved from the reaction. On decrease of water evolution, the temperature was raised to 370° F., and heating with agitation was continued until an acid value of 25 to 30 was obtained. The temperature was then decreased to 300° F., and the resulting polyester was mixed into 260 g. of styrene containing 0.86 g. of monotertiarybutyl hydroquinone as a stabilizer. A clear liquid polyester was obtained.

Glass mat laminates were then prepared as described in Example 7. The glass laminates were found to be self-extenguishing by ASTM–D653–56T.

EXAMPLE 9

Into a reaction flask are charged the following reagents:

| | G. |
|---|---|
| Ester of Example 1 (1.0 mole) | 413 |
| Fumaric acid (1.0 mole) | 95 |
| Ethylene glycol (1.1 mole) | 56 |
| Diethylene glycol (1.0 mole) | 96 |

The reaction mixture is converted to a polyester resin following the procedure of Example 7. Styrene, 350 g., is added to the polyester to result in a clear, liquid polyester solution and glass mat laminates are prepared as described in Example 7. The glass laminates are nonburning.

EXAMPLE 10

Following the procedure of Example 7, a liquid polyester resin solution in styrene is produced employing as the flame-retarding component the carboxylic ester of pyromellitic anhydride and 1,4,5,6,7,7-hexachlorobicyclo (2.2.1)-5-heptene-2-methanol.

EXAMPLE 11

Following the procedure of Example 7, a liquid polyester resin is produced employing as the flame-retarding component the carboxylic ester of trimellitic anhydride and 1,4,5,6,7,7-hexachlorobicyclo(2.2.1)-5-heptenol-2.

EXAMPLE 12

Following the procedure of Example 7, a liquid polyester resin is produced employing as the flame-retarding component the carboxylic ester of trimellitic anhydride and 1,4,5,6,7,7 - hexabromobicyclo(2.2.1) - 5-heptene-2-methanol.

The foregoing examples have illustrated the formation of the novel halogenated carboxylic esters of the present invention, their utilization in the formation of polyester resins, and the properties obtained by curing such polyester resins in the presence or absence of reinforcing glass.

The novel carboxylic esters are prepared in high yields by means of a simple and economical process which is equally applicable to other halogenated carboxylic esters not specifically illustrated in the examples but coming within the scope of the disclosure. It will be apparent that other carboxylic esters falling within the scope of the present invention can be employed in place of the esters specifically illustrated in the examples to prepare the polyester resins of the present invention. Methods of making the polyester resins containing the halogenated carboxylic esters including reaction components, reaction conditions, catalysts, solvents, and the like, can be varied widely without departing from the scope of the present invention. The polyester resins of the present invention are useful in all applications heretofore developed for polyester resins and are of particular utility in applications in which nonflammability is desired.

What is claimed is:

1. A halogenated polyfunctional carboxylic ester having in its acid form the general formula:

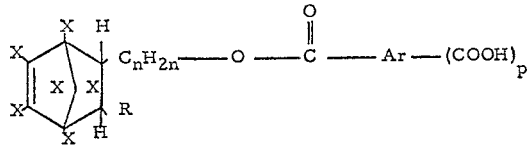

wherein X is chlorine or bromine; R is $-C_mH_{(2m+1)}$ or $-C_mH_{2m}OH$; Ar is an aryl radical, $m$ and $n$ are integers from 0 to 8, inclusive, and $p$ is an integer from 1 to 3, inclusive.

2. The halogenated carboxylic ester of claim 1 wherein Ar is a benzene radical.

3. The halogenated carboxylic ester of claim 2, wherein $p$ is at least 2 and R is $-C_mH_{(2m+1)}$.

4. The halogenated carboxylic ester of claim 3, wherein $m$ is zero.

5. The halogenated carboxylic ester of claim 1 having the formula:

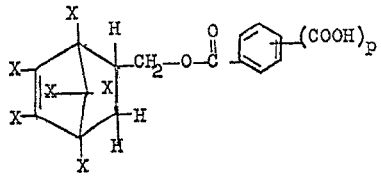

wherein $p$ is at least 2.

6. The halogenated carboxylic ester of claim 1 having the formula:

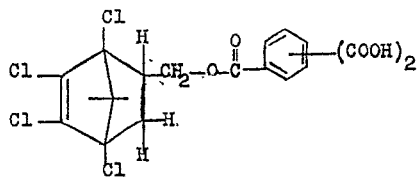

References Cited

UNITED STATES PATENTS 3,250,824  5/1966  Maahs et al. _____ 260—869
3,318,933  5/1967  Jason et al. _____ 260—434

WILLIAM H. SHORT, *Primary Examiner.*

E. NIELSEN, *Assistant Examiner.*

U.S. Cl. X.R.

260—75, 869; 161—194